Dec. 8, 1925.

S. S. WHEELER

DYNAMO ELECTRIC MACHINE

Filed Oct. 12, 1922        5 Sheets-Sheet 1

1,564,389

Inventor,
Schuyler S. Wheeler,
By Samuel W. Balch
Attorney.

Dec. 8, 1925.                                                1,564,389
S. S. WHEELER
DYNAMO ELECTRIC MACHINE
Filed Oct. 12, 1922          5 Sheets-Sheet 2

Inventor,
Schuyler S. Wheeler,
By Samuel W. Balch
Attorney.

Dec. 8, 1925.
S. S. WHEELER
1,564,389
DYNAMO ELECTRIC MACHINE
Filed Oct. 12, 1922          5 Sheets-Sheet 3
Fig. 5. 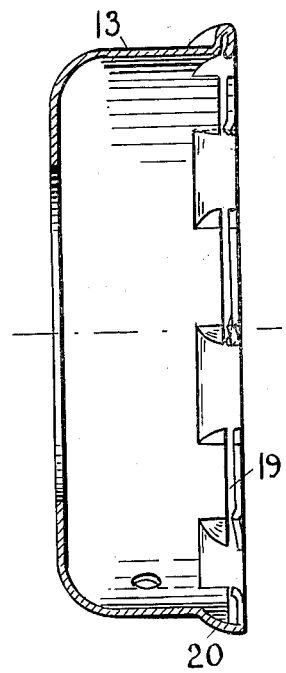 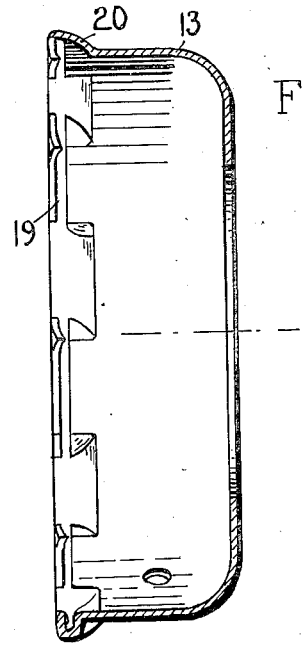 Fig. 6.

Inventor,
Schuyler S. Wheeler,
By Samuel W. Balch
Attorney.

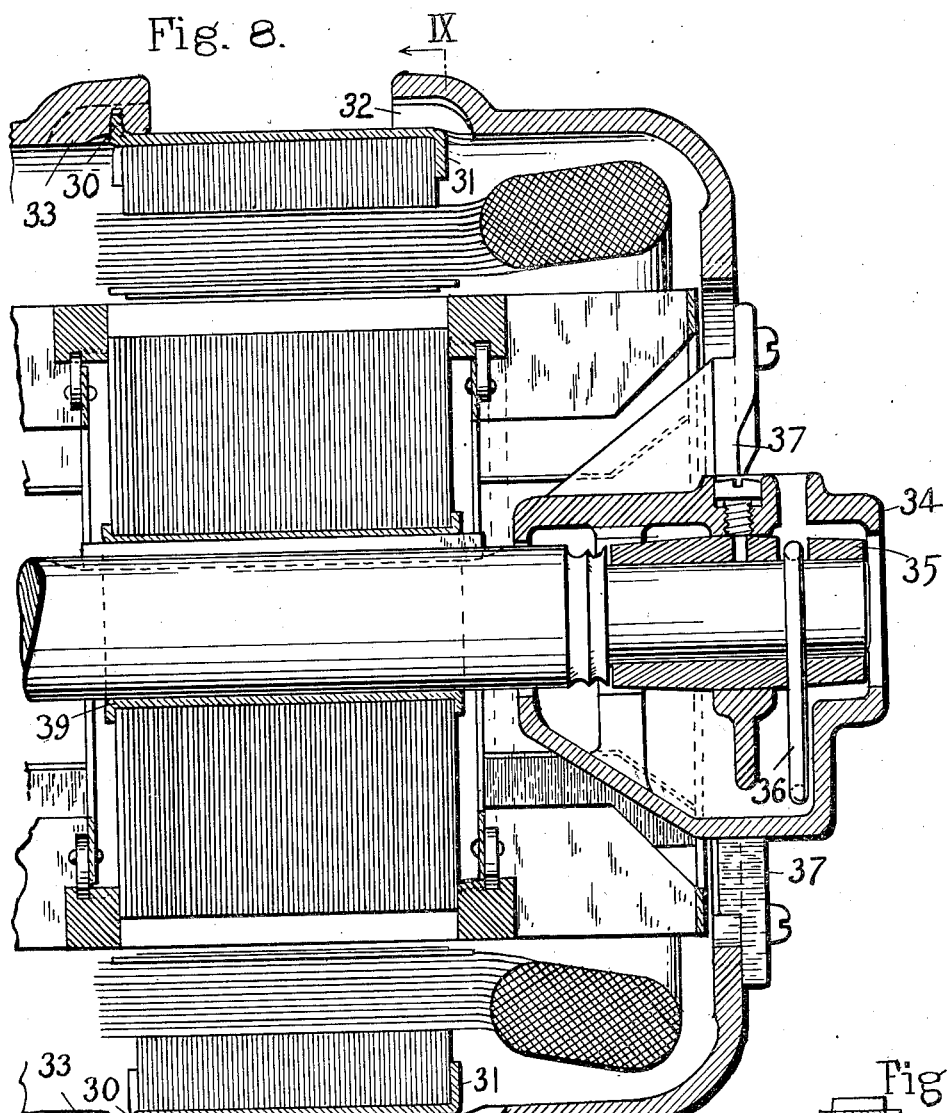
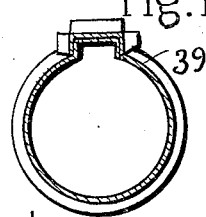
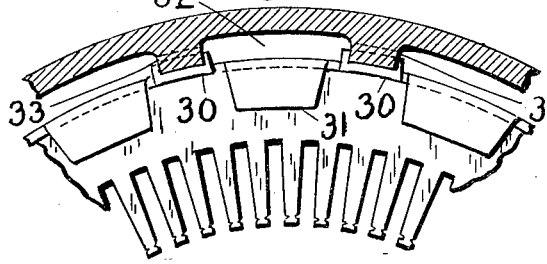

Dec. 8, 1925.

S. S. WHEELER 1,564,389

DYNAMO ELECTRIC MACHINE

Filed Oct. 12, 1922  5 Sheets-Sheet 5

Inventor
Schuyler S Wheeler,
By Samuel W. Balch
Attorney

Patented Dec. 8, 1925.

1,564,389

UNITED STATES PATENT OFFICE.

SCHUYLER SKAATS WHEELER, OF BERNARDSVILLE, NEW JERSEY; AMY SUTTON WHEELER, EXECUTRIX OF SAID SCHUYLER SKAATS WHEELER, DECEASED, ASSIGNOR TO CROCKER-WHEELER COMPANY, OF AMPERE, NEW JERSEY, A CORPORATION OF NEW JERSEY.

DYNAMO-ELECTRIC MACHINE.

Application filed October 12, 1922. Serial No. 593,992.

*To all whom it may concern:*

Be it known that I, SCHUYLER SKAATS WHEELER, a citizen of the United States of America, and a resident of Bernardsville, in the county of Somerset and State of New Jersey, have invented certain new and useful Improvements in Dynamo-Electric Machines, of which the following is a specification.

The dynamo-electric machines constructed in accordance with this invention are especially adapted to large quantity production. They are also readily disassembled to the extent that is usually necessary. The construction secures good heat dissipation, protection for the windings, and rigid preservation of the air-gap.

In the accompanying five sheets of drawings which form a part of this specification, Figure 1 is a longitudinal section through a dynamo-electric machine which embodies this invention on the line I—I of Fig. 2, the winding-shields being of sheet iron.

Figs. 5 and 6 are longitudinal sections through the two winding-shields.

Fig. 8 is a longitudinal section through a modified form of construction using cast winding-shields.

Fig. 9 is a section through one of the winding-shields showing a portion on the line IX—IX of Fig. 8.

Fig. 10 is a view of the end of the sleeve for the laminæ of the rotor core.

Figure 1:
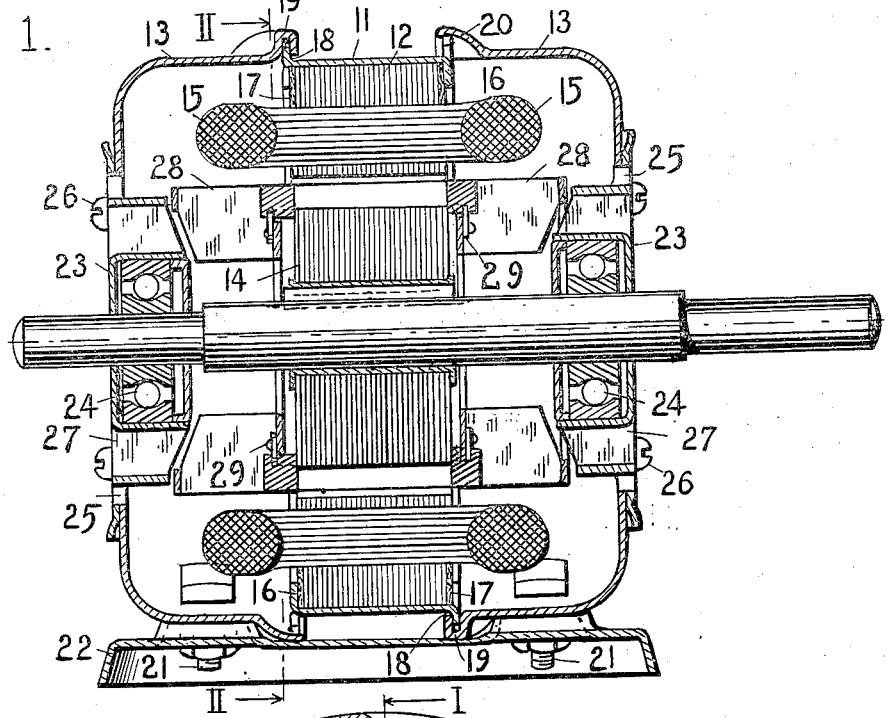

In the form shown in Figs. 1 to 7 there is shown a frame consisting of a middle portion or band 11 which binds a stack of stator laminæ 12 and winding-shields 13, 13. The frame encloses the rotor 14 and protects the stator windings 15, 15.

In assembling, a suitable mandril is employed to insure alignment of the laminæ teeth while the laminæ are being stacked. The band is wider than the thickness of the stack and its edges are notched and portions of the edges are bent over to form jaws 16, 16 between which and the band the stack is held rigidly. At the two ends of the stack fibre rings 17, 17 are inserted. The band and the stack held in place thereby form what I call a stator package. The band should fit so tightly about the stack that the laminæ are secured against displacement and that heat is readily conducted from the laminæ to the band for dissipation by air currents which may be directed against the outside of the band. The band should be strained to a material fraction of the tensile strength of the metal and much beyond what would be practicable by ordinary mechanical means. While other methods may be adopted for this purpose I have found it sufficient and convenient to provide an endless band which is shrunk on by being heated, slipped over the stack of laminæ and allowed to cool. The band may thus readily be applied so tightly that the metal thereof is somewhat stretched.

Portions of the edges of the band which are not bent inwardly to form jaws are bent outwardly to form lugs 18, 18 for engagement with the winding-shields. It will be seen that there are gaps between the lugs which are as wide as or wider than the lugs. The top edges of the lugs are turned off so as to be concentric with the bore of the stack of laminæ. Among the advantages of the construction of the stator package above described are the ease with which it can be wound and the avoidance of the use of bolts to hold the laminæ together, thus escaping the magnetic and mechanical difficulties incident to the use thereof.

The winding-shields form protecting coverings for the portions of the stator windings which lie outside of the core slots. In Fig. 6 they are assumed to be of sheet metal, but may be of cast iron. They are dome-shaped approximately like a bowl with the bottom cut out. The rim of each metal shield at its larger opening is folded at spaced intervals corresponding to the outstanding lugs along the respective edges of the band to form discontinuous peripheral grooves 19, 19 which face inwardly and engage the lugs outside the outer surface of the band. Between the ends of the grooves on the rims of the shields are enlargements 20, 20 which form passageways or nozzles for the discharge of air from the interior against the outside of the stator package.

Figure 7:
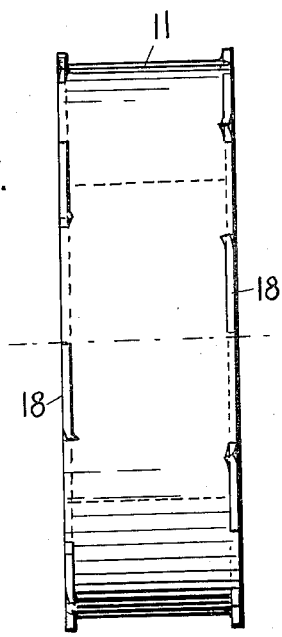
Fig. 7 is a side view of the stator package.
Figure 11:
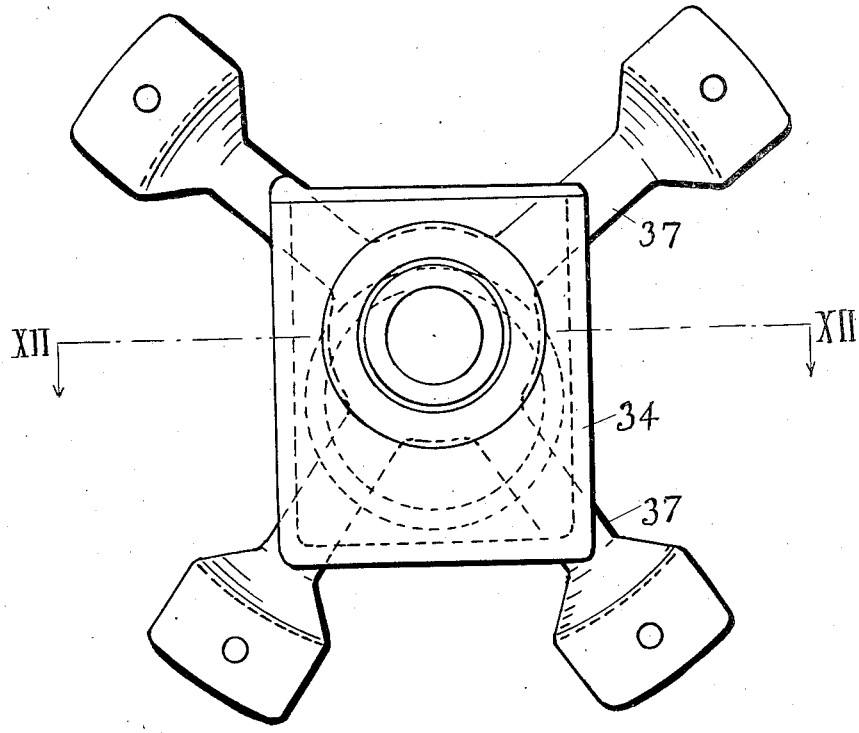
Fig. 11 is a front view of the bearing support or head.
Figure 12:
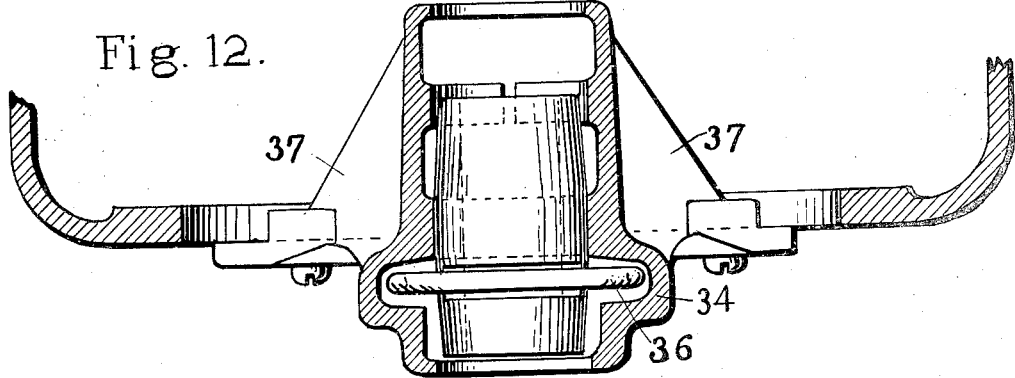
Fig. 12 is a horizontal section through the same on the line XII—XII of Fig. 11, in connection with a portion of the winding shield in section.

In assembling, the lugs on the band are first entered into the enlargements until the lugs are brought opposite the grooves and then by rotary movement the lugs are entered in the grooves after the manner of engaging a bayonet-joint. These may be merely a snug fit. But the end shields may be shrunk on, since separation of the parts here for access and repair is not likely to be required. Means may be provided, as by closing each of the grooves at one end, to prevent the passage of a lug completely through a groove. The closures are at the same ends in the two shields if each is viewed the same way, but when they are faced for assembling the locking will be by opposite hand rotation. The two shields are fastened by bolts 21, 21 to a base 22, and when so held they are locked against detachment from the stator package as any attempt to rotate the stator package in either direction will bring the lugs against the groove closures in one shield or the other. Instead of closing the grooves at one end, the lugs may be bent or enlarged at one end as shown in Fig. 7 to afford the requisite stops. The advantages of the winding-shields constructed as herein illustrated are that being of a dome-shape they have maximum strength against distortion for the quantity of material used, and they serve as correct air guides in ventilation. Moreover, because of their shape and the fact that they are attached to the outwardly projecting lugs of the stator package and they envelope the outside of the band there is ample clearance between the windings and the shields. The openings of the shields at the smaller ends being as large as the bore of the stator the rotor may be removed while the shields remain in place, thus securing protection to the stator coils when the machine is partially disassembled as well as when it is completely assembled.

Bearing-supports 23, 23 fit the smaller openings in the winding-shields and support ball-bearings 24, 24 for the rotor shaft. Small holes 25, 25 through these supports are provided in line with the gap between the rotor and the stator, through which feelers can be inserted to ascertain if the rotor is properly centered in the stator. The bearing-supports are held to the shields by screws 26, 26 and are easily removable. Separation here is sufficient for such inspection, cleaning and repairs and removal of the rotor as are usually required. The bearing-supports are constructed in as open a manner as possible to admit air for cooling. The spokes 27, 27 between the center portion and the rim are constructed as shown to offer minimum obstruction to the passage of air into the interior cavity of the machine. To this end they are made as narrow as possible along the line of flow of air into the interior of the machine. Necessary strength is secured by extending them along the line of flow.

Figure 2:
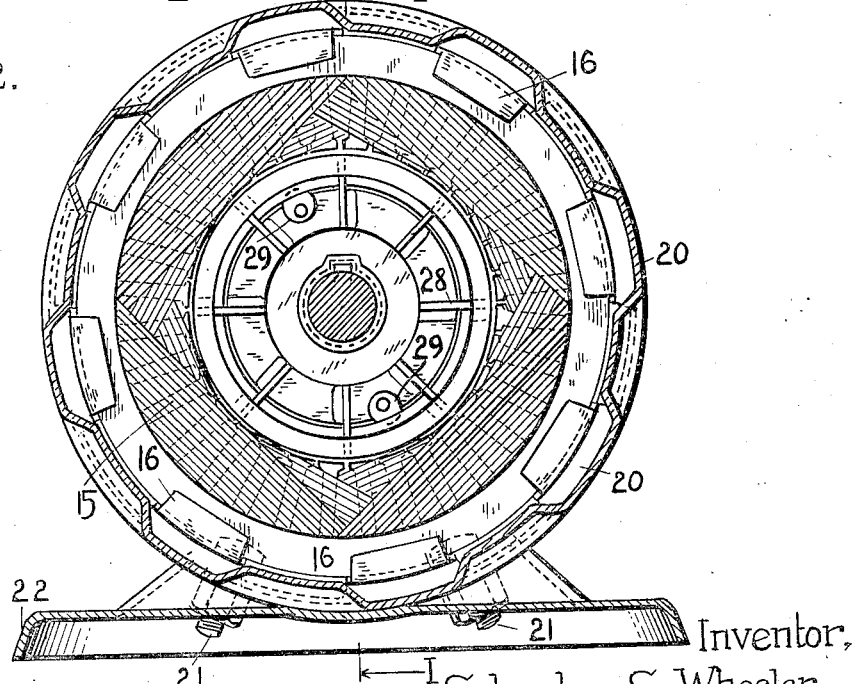
Fig. 2 is a cross section on the line II—II of Fig. 1.
Figure 3:
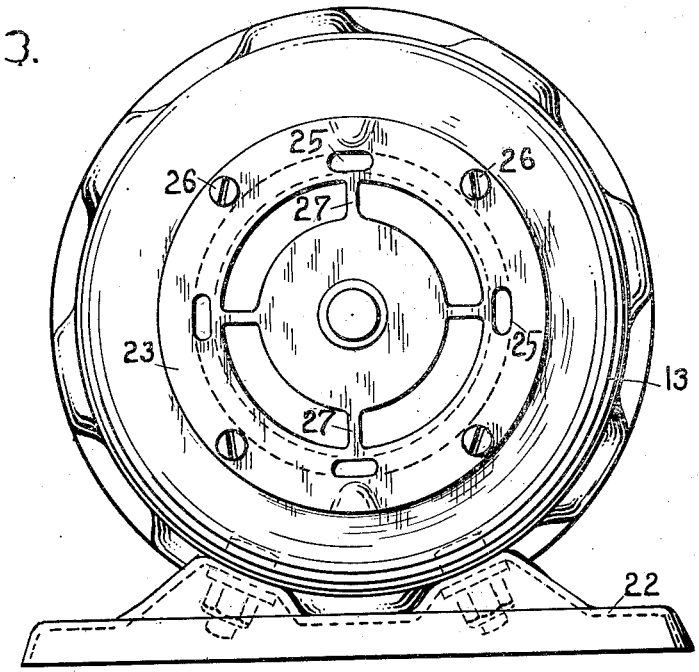
Fig. 3 is a front view of the dynamo-electric machine.
Figure 4:
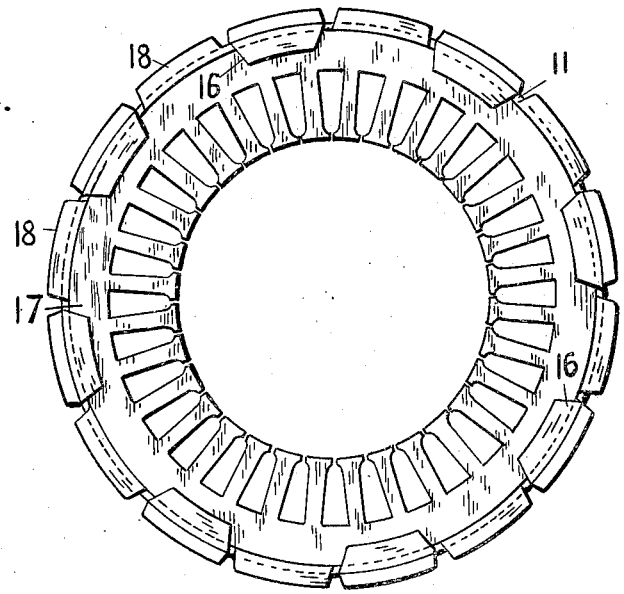
Fig. 4 is a front view of a stack of laminæ forming the stator package.

Fans 28, 28 are attached to the rotor to force circulation of the air. The blades of the fans are mounted between two rings to one of which buttons 29, 29 are excentrically pivoted, as is indicated in Figs. 1, 2 and 8. The buttons fit tightly in a groove cut in the end ring of the rotor squirrel cage.

The form shown in Figs. 8 to 12 is an embodiment of the invention with cast winding-shields. On the stator package are upstanding lugs 30, 30 which are narrower than the jaws 31, 31 to make the air-ports or nozzles 32, 32 as wide as is practicable. Inwardly facing grooves to receive the lugs are cut across ribs 33, 33 which are cast inside the rims of the winding-shields. Each bearing-support is a housing 34. This housing is an alternative construction over that shown in Fig. 1. It is usually desirable in machines of considerable size whereas the construction of Fig. 1 in this respect is admissible in machines of smaller size and may be preferred for its simplicity. The housing carries bearing bushing 35 and is formed to hold oil which is carried to the rotor shaft by an oil-ring 36. The oil-ring is located near the outer end of the bearing so that the outside of the housing may approximate to stream-line form and be so shaped at points where the air passages are somewhat restricted as to favor the passage of air. The housing is supported by spider-arms 37, 37 extending from the winding-shield and these spring from the necessary projections of the housing where they will offer minimum obstruction. Since only the light spider-arms are integral with the housing the molding thereof is facilitated.

It will be noted that the oil-well, the oil-ring, the oil-guages and the oil-cocks are all located either outside or inside of the plane where the supporting arms seat on the winding-shield whereby obstruction to flow of air to the interior of the machine is minimized.

The rotor laminæ are held together by an interior tube 39. This tube is formed by bending a strip of sheet metal so as to leave a key-way. The tube is somewhat longer than the thickness of the stack of rotor laminæ and the ends are riveted or flanged over to hold the laminae firmly together. In order that the tube shall not collapse and liberate the laminae when the shaft is withdrawn, the two edges of the strip are overlapped at the key-way as shown. This construction I have called a rotor package. It may be said to consist of a stack of rotor laminae held together at their bore by a tubular sheet-metal rivet through which the shaft upon which the rotor is to be mounted, is intended to be passed in assembling.

It will be seen from the foregoing description that the frame is readily constructed of sheet metal or partly of sheet metal and partly of cast iron; that the laminæ of the stator are held very rigidly against any displacement; that ample room is provided for the stator coils under the winding-shields; that the machine may be easily assembled and readily disassembled to the extent necessary for such repairs and inspection as are ordinarily required; that the stator coils are protected by the winding-shields when the bearing head is removed and the rotor withdrawn; that the centering of the rotor is easily accomplished and tested; and that the machine is designed with special reference to dissipation of heat by conduction and circulation of air.

What I claim, and desire to secure by Letters Patent, is:

1. A dynamo-electric machine comprising a stator, winding-shields attached to each side of the stator by a series of bayonet-joint connections with nozzles at each bayonet-joint which are directed across the rim of the stator, and means for blowing air through the nozzles.

2. A dynamo-electric machine comprising a stack of laminæ, a band of sheet metal in heat conducting contact with the stack of laminæ, winding-shields attached to each edge of the band by a series of bayonet-joint connections with nozzles at each bayonet-joint connection which are directed across the outside of the band, and means for blowing air through the nozzles.

Signed at Ampere, N. J., this ninth day of October, 1922.

SCHUYLER SKAATS WHEELER.